(12) United States Patent
Gardner, Jr. et al.

(10) Patent No.: US 6,246,642 B1
(45) Date of Patent: Jun. 12, 2001

(54) AUTOMATED OPTICAL DETECTION SYSTEM AND METHOD

(75) Inventors: Richard Lynn Gardner, Jr., Greeley; Richard A. Irwin, Fort Collins, both of CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/290,926

(22) Filed: Apr. 13, 1999

(51) Int. Cl.[7] .................................................. G11B 17/22
(52) U.S. Cl. ............................................................ 369/36
(58) Field of Search ..................................... 367/34, 36, 38, 367/75.1, 75.2, 77.1, 77.2, 178, 191, 192; 360/99.02, 99.06, 92

(56) References Cited

U.S. PATENT DOCUMENTS

| | | | |
|---|---|---|---|
| 5,544,146 | 8/1996 | Luffel et al. | 369/178 |
| 5,637,854 | 6/1997 | Thomas | 235/462 |
| 5,644,559 | 7/1997 | Christie, Jr. et al. | 369/36 |
| 5,682,096 | 10/1997 | Christie, Jr. et al. | 324/207.2 |
| 5,729,464 | * 3/1998 | Dimitri | 369/34 |
| 5,764,615 | * 6/1998 | Ware et al. | 369/178 |
| 5,818,802 | * 10/1998 | Menke et al. | 369/36 |
| 6,078,278 | * 6/2000 | Heath et al. | 369/36 |

* cited by examiner

*Primary Examiner*—Allen T. Cao

(57) ABSTRACT

An automated object detection system and method is disclosed. The automated detection system uses an imaging apparatus, such as a bar code reader, to determine if an object is located at a predetermined location. The automated object detection system has a reference surface with a target located on the reference surface. The imaging apparatus is positioned relative to the reference surface so as to image the target. The automated object detection system is adapted to have objects located in a light path between the target and the imaging apparatus so as to block the target from being imaged. If the imaging apparatus is able to image the target, the automated optical detection system may determine that no object is located between the target and the imaging apparatus. If the imaging apparatus is unable to image the target, the automated optical detection system may determine that an object is located between the target and the imaging apparatus.

22 Claims, 10 Drawing Sheets

AUTOMATED OPTICAL DETECTION SYSTEM AND METHOD

FIELD OF THE INVENTION

The present invention relates generally to locating and identifying an object and, more particularly, to using a bar code reader in an automated media exchanger to positively determine if media is located at a predetermined location in the automated media exchanger and to identify the media.

BACKGROUND OF THE INVENTION

An automated media exchanger is a device that moves media from a media library to a media player and vice versa. Examples of media that may be moved by an automated media exchanger include magnetic media, compact discs and digital linear tapes. An automated media exchanger typically has a media library that stores the media, a processor that stores the location and identity of the media, media players that read the media, and a media handler that moves the media between the media library and a media player. Servo and orientation systems may also be included in the automated media exchanger to move the media handler to specific locations and to report the location of the media handler to the processor. The media located in the media library may need to be located, extracted from the media library by the media handler and inserted into a media player. Likewise, media located in a media player may need to be extracted from the media player by the media handler and placed into a predetermined location in the media library.

An example of a media library is a plurality of containers, each of which is commonly referred to as a magazine. A magazine typically has several openings or slots in the front side of the magazine. Each slot is adapted to hold media. A single magazine may hold several pieces of media and the media library may comprise several magazines. Loading media into a media library typically consists of a user loading media into the slots in the magazines and then placing the magazines into the media library in the automated media exchanger. The user, thus, is ultimately responsible for assuring that the media is properly loaded into the magazines.

The user may input information to the processor indicating the location and identification of specific media located in the media library. This information identifies the individual pieces of media in the media library, in addition, this information identifies the specific slots in the magazines where the media is located. The automated media exchanger is then able to locate a specific piece of media based on the information supplied by the user. When a specific piece of media is required to be inserted into the media player, the processor instructs the servo system to move the media handler adjacent to the slot in the magazine where the specific media is located. The media handler may then extract the media from the slot. The servo system may then instruct the media handler to move the media to a media player and insert the media into the media player.

The automated media exchanger may also move media from the media players to specific slots in the magazines. In order to move a piece of media from a media player to a specific slot in a magazine, the processor first instructs the servo system to move the media handler to a media player where the media is located. The media handler then extracts the media from the media player. When the media has been extracted from the media player, the processor instructs the media handler to move adjacent to the specific slot in the magazine where the media is to be placed. The media handler then inserts the media into the specific slot in the magazine.

The automated media exchanger, thus, relies on the information provided by the user to locate specific media located in the media library. There are many factors in the interface between the user and the automated media exchanger that may cause the automated media exchanger to encounter errors when it attempts to locate media and move media between a magazine and a media player. An example of such an error is if the user incorrectly inputs the location of the media into the processor. The automated media exchanger will then insert incorrect media into the media players. Another example of an error is if the user leaves a slot in a magazine empty and indicates that a specific piece of media is located in the empty slot. The automated media exchanger will then attempt to retrieve a specific piece of media from an empty slot. A further example of an error is if the user incorrectly places the media into the slots, e.g., the user may install the media upside down. In this case, damage may occur to the media, the media handler, or a media player if the media handler attempts to retrieve the upside down media or if the media handler attempts to insert the upside down media into a media player.

Automated media exchangers may detect if given slots in the magazines contain media by physically sensing the presence of media in the slots. For this purpose, each slot may have a switch that toggles when media is inserted into the slot. The switches may be connected to a processor which determines if a slot is occupied by determining if the switch associated with the slot has toggled. The use of such switches, however, increases the complexity of the magazines and the automated media exchanger by requiring a plurality of switches to be located in the magazines and wiring to be run between a processor and the switches. Further, the switches are susceptible to errors if the switches stick in an open or closed position or if the wiring between the magazines and the processor is not properly connected.

As an alternative to the slot-mounted switches described above, the automated media exchanger may be provided with a sensor that physically detects if media is present in the slots. The sensor may be a switch that is moved into each slot. The switch may toggle if it comes into contact with a piece of media. This method of detecting media, however, is slow because the sensor must physically move to each slot when the magazines are placed into the automated media exchanger and physically detect the presence or absence of media. Furthermore, neither of the detection methods described above will determine if the media is installed correctly into the slots and neither method will identify the media.

Optical systems are also sometimes used to determine if the slots contain media. An optical system may image a feature on the media to determine if media is present in the slots. However, if the feature is not present on the media or if the feature cannot be imaged, the optical system may determine that the slot is empty, when in fact, the slot may be occupied. An optical system, thus, may not determine, with certainty, that a slot is empty. An optical system may only determine, with certainty, that a slot is occupied.

Therefore, a need exists for an automated detection system that may be used in an automated media exchanger to determine, with certainty, whether a magazine slot contains media and whether the media is correctly installed into the slot. Additionally, there is a need for an automated detection system that will simultaneously identify media located in the media library.

SUMMARY OF THE INVENTION

The present invention is directed toward an automated optical detection system. The automated optical detection system may determine if objects are located at predetermined locations and may simultaneously identify the objects.

The automated optical detection system may comprise a light source, a reference surface, and an imaging apparatus. The imaging apparatus may be located so as to image the reference surface. The imaging apparatus may also be mobile relative to the reference surface. The light source may be located so as to illuminate the portion of the reference surface that is imaged by the imaging apparatus.

The reference surface may have an area of reflective contrast. The area of reflective contrast is an area that is imageable by the imaging apparatus and that may be optically differentiated from other objects that may be imaged by the imaging apparatus. The automated optical detection system may be adapted to have the objects which are to be detected located between the area of reflective contrast and the imaging apparatus. The objects may, thus, block the imaging apparatus from imaging the area of reflective contrast.

When no object is located between the area of reflective contrast and the imaging apparatus, the imaging apparatus will image of the area of reflective contrast. When the imaging apparatus images the area of reflective contrast, the automated optical detection system is able to determine, with certainty, that no object is present between of the area of reflective contrast and the imaging apparatus.

When an object is located between the area of reflective contrast and the imaging apparatus, the imaging apparatus will not be able to image the area of reflective contrast. When the imaging apparatus is unable to image the area of reflective contrast, the automated optical detection system is able to determine, with certainty, that an object is located between the area of reflective contrast and the imaging apparatus.

DETAILED DESCRIPTION OF THE INVENTION

Figure 1:
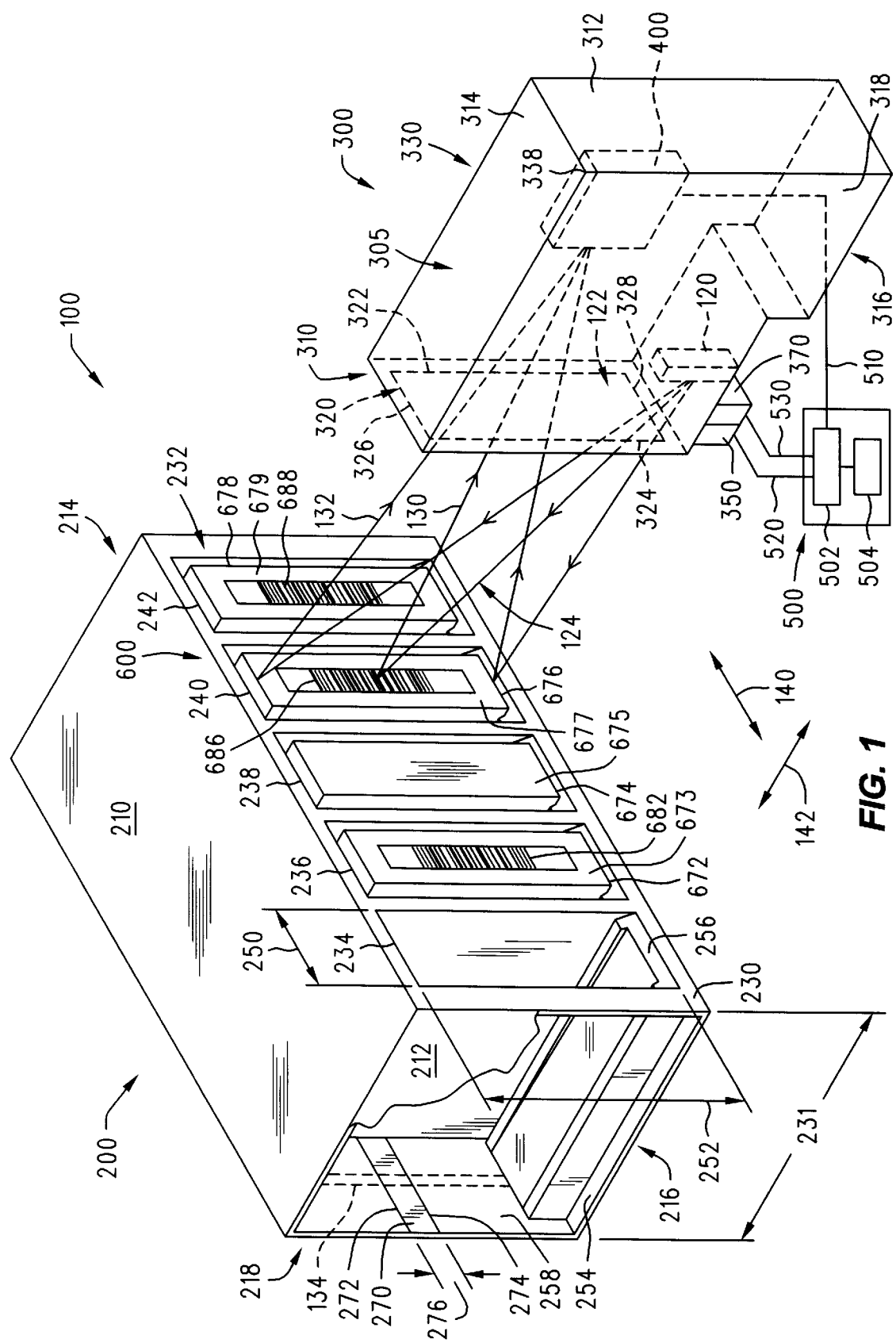
FIG. 1 is a top perspective view of an automatic media exchanger using an automated optical detection system.

FIGS. 1 through 10 in general, illustrate method for automatically detecting objects 600. The method of detecting objects may comprise: providing a plurality of objects 600; providing an object holding mechanism 200 having a plurality of holding locations 232, wherein each of the holding locations 232 is adapted to locate at least one of the plurality of objects 600; providing an object holding mechanism target 270 associated with the object holding mechanism 200; providing an imaging apparatus 400 which is moveable relative to the object holding mechanism 200; positioning the imaging apparatus 400 adjacent a selected one of the plurality of holding locations 232; generating an image with the imaging apparatus 400; performing a first analysis of the image to determine whether the image is an image of the holding mechanism target 270; and determining whether one of the plurality of objects 600 is located in association with the selected one of the plurality of holding locations 232 based upon the first analysis.

FIGS. 1 through 10 in general, further illustrate an automated media exchanger 100 employing an optical detection system. The automated media exchanger 100 is of the type having a media magazine 200 including a plurality of slots 232 adapted to receive media devices 600 therein. The automated media exchanger 100 is further of the type having a moveable picker device 300 positionable adjacent a selected slot of the plurality of slots 232 and adapted to move media devices 600 into and out of the selected slot. The automated media exchanger 100 comprising: a light source 120 associated with the picker device 300; an imaging apparatus 400 associated with the picker device 300; a target 270 associated with the selected slot 232. Wherein the target 270 is not imageable by the imaging apparatus 400 when one of the media devices 600 is received within the selected slot 232; and wherein the target 270 is imageable by the imaging apparatus 400 when one of the media devices 600 is not received within the selected slot 232.

Having thus described the automated optical detection system and method in general, the system and method will now be described in further detail.

FIG. 1 illustrates the automated optical detection system used in conjunction with an automated media exchanger 100. The automated media exchanger 100 is illustrated using digital linear tape cartridges 600 as the media being exchanged. It is to be understood, however, that the following description is for illustration purposes only and that the automated optical detection system may readily be used in conjunction with other devices. It is also to be understood that the automated media exchanger 100 may be readily adapted to use media other than digital linear tape cartridges 600.

The automated media exchanger 100 may have a light source 120, a magazine 200, a media handler 300, sometimes also referred to herein as a "picker," an imaging apparatus 400, and a processor 500. The automated media exchanger 100 may further have an incident light path 124 extending between the light source 120 and the magazine 200 and an image light path 130 extending between the magazine 200 and the imaging apparatus 400.

Figure 2:
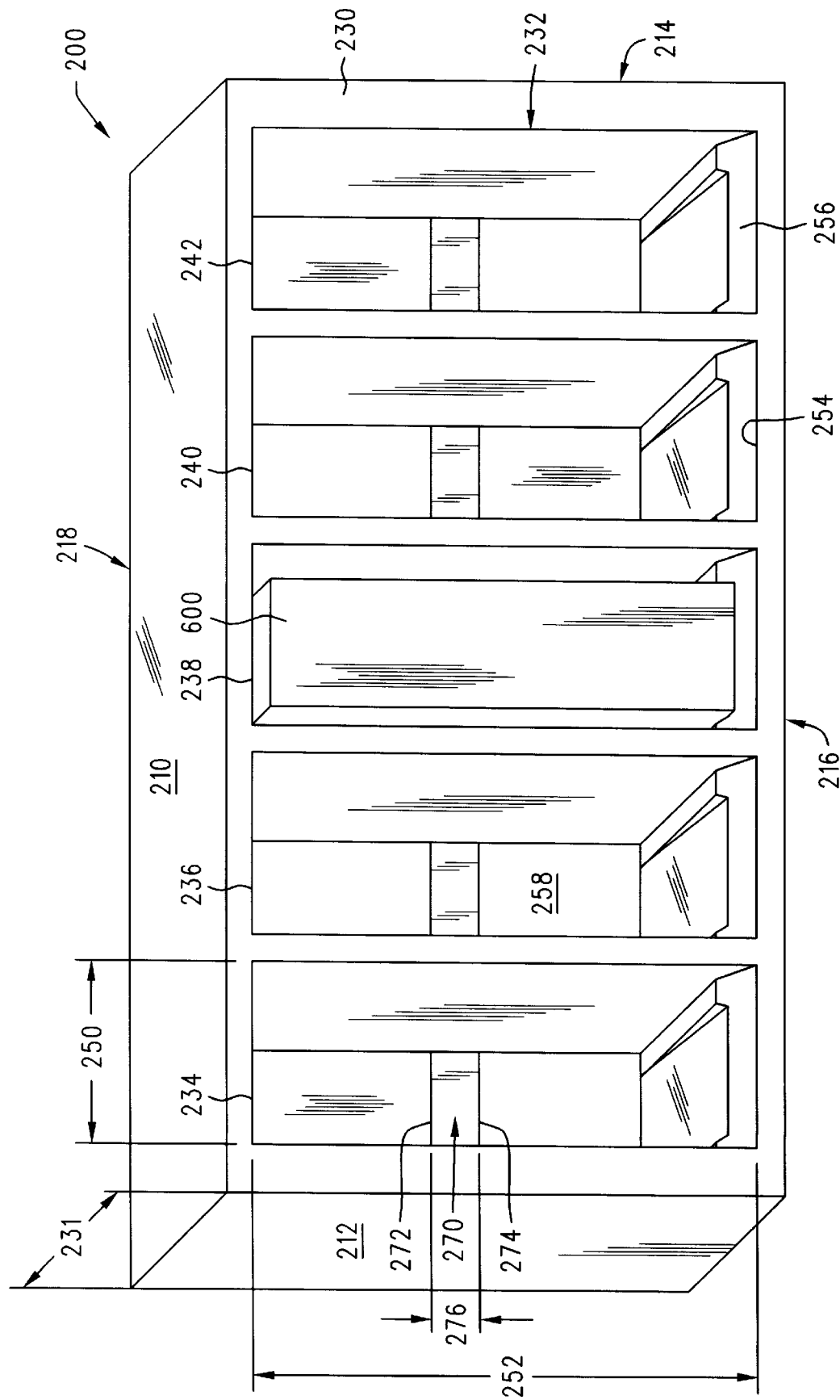
FIG. 2 is front perspective view of a media magazine that may be used in conjunction with the automatic media exchanger of FIG. 1.

FIG. 2 illustrates a detailed embodiment of the magazine 200. The magazine 200 may have a top side 210, a left side 212, a right side 214, a bottom side 216, a back side 218, and a front side 230. The magazine 200 may have a depth 231 extending between the back side 218 and the front side 230. The depth 231, may, for example, be approximately 11 centimeters. The front side 230 of the magazine 200 may comprise a plurality of slots 232. The slots 232 may be openings in the front side 230 of the magazine 200. The slots 232 may be adapted to hold digital linear tape cartridges 600. The magazine 200 illustrated in FIGS. 1 and 2 has five slots 232, depicted numerically as slot 234, slot 236, slot 238, slot 240, and slot 242. The slots 232 may each have a slot width 250 and a slot height 252. The slots 232 may be appropriately sized to hold the digital linear tape cartridges 600 used by the automated media exchanger 100. The bottom side 216 of the magazine 200 may have an inner surface 254. The inner surface 254 may have several slides 256 affixed to the inner surface 254. The locations of the slides 256 may correspond to the locations of the slots 232. The slides 256 may serve to hold digital linear tape cartridges 600 in the slots 232.

The back side 218 of the magazine 200 may have an inner surface 258. The inner surface 258 may face into the magazine 200 and toward the front side 230. The inner surface 258 may have an area of reflective contrast 270 extending between the left side 212 and the right side 214 of the magazine 200. The area of reflective contrast 270 may be an area that reflects either more or less light than the remainder of the inner surface 258 when both the inner surface 258 and the area of reflective contrast 270 are equally illuminated. The area of reflective contrast 270, may, for example, be a reflective surface, such as a light-colored surface. The remaining inner surface 258 may be a nonreflective surface, such as a dark-colored surface. A light-colored surface typically reflects more light than a dark-colored surface, thus, the transition from a light-colored surface to a dark-colored surface may constitute an area of reflective contrast.

The area of reflective contrast 270 may have a first edge 272 and a second edge 274. The first edge 272 and the second edge 274 may be separated by a width 276. The width 276 may, for example, be approximately one centimeter. As an alternative to the single stripe depicted in FIG. 2, the area of reflective contrast 270 may comprise a plurality of successive reflective and nonreflective parallel stripes, such as a bar code, not shown, extending between the left side 212 and the right side 214 of the magazine 200.

Figure 3:
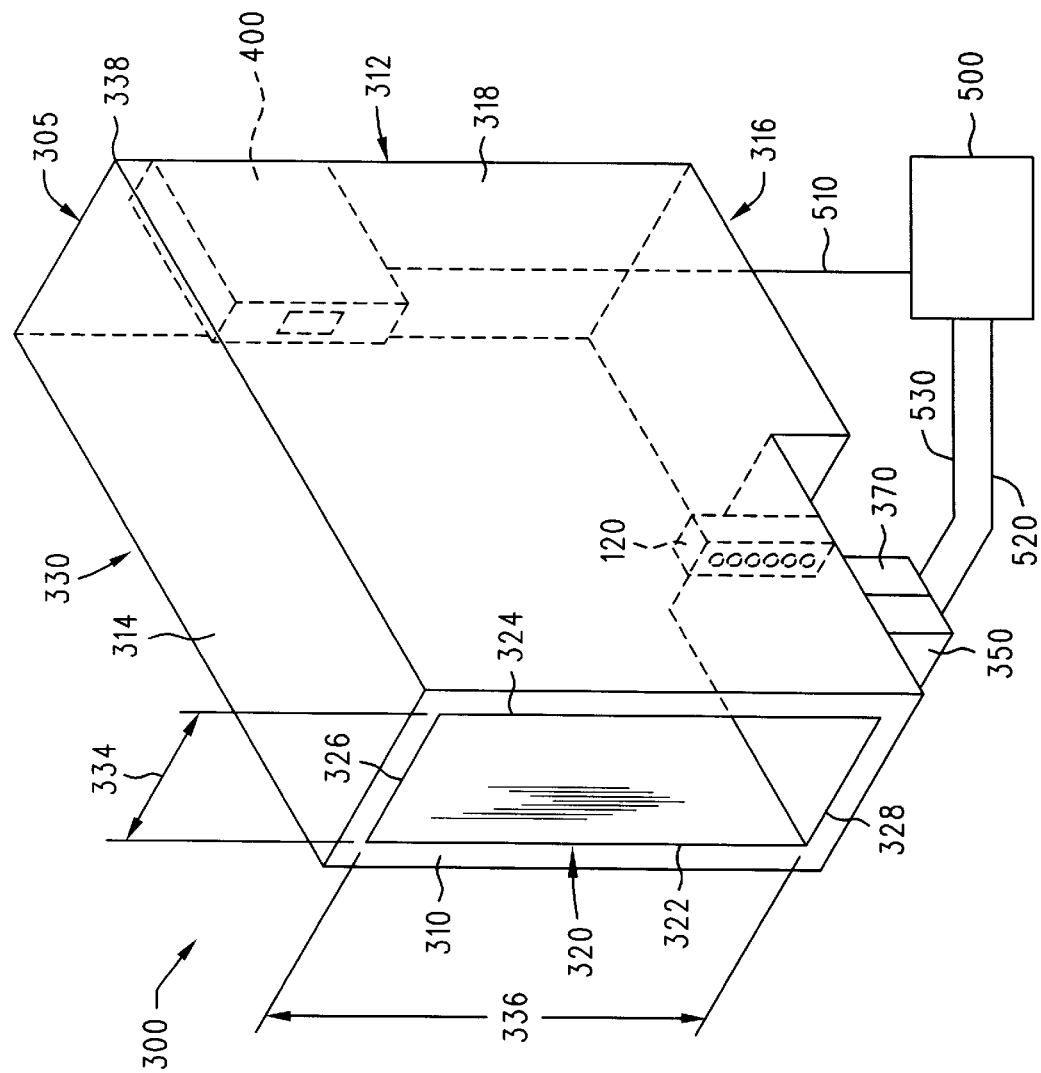
FIG. 3 is a top perspective view of a media handler that may be used in conjunction with the automated media exchanger of FIG. 1.

FIG. 3 illustrates a detailed embodiment of the media handler 300. The media handler 300 may have a housing 305. The housing 305 may be generally a parallelepiped structure and may have a front side 310, a back side 312, a top side 314, a bottom side 316, a left side 318, and a right side 330. The housing 305 may have a corner 338 defined by the intersection of the back side 312, the top side 314, and the left side 318. The media handler 300 may have an opening 320 in the front side 310. The opening 320 may have a right side 322, a left side 324, a top side 326, and a bottom side 328. The opening 320 may have a width 334 extending between the opening left side 324 and the opening right side 322. The opening 320 may have a height 336 extending between the opening top side 326 and the opening bottom side 328. The width 334 and the height 336 of the opening 320 may be appropriately sized so as to allow a digital linear tape cartridge 600, FIG. 2, to pass through the opening 320 and into the housing 305.

The media handler 300 may have a light source 120 located in the interior of the housing 305 and affixed to the housing left side 318. The light source 120 may be located so that it will not interfere with a digital linear tape cartridge 600, FIG. 2, that may be located in the housing 305. The light source 120 may emit light in a frequency band that is selected to respond with other components in the automated media exchanger 100, FIG. 1. The light source 120 may, as an example, comprise a linear array of light emitting diodes. An example of a light source for use in a media handler is disclosed in the U.S. patent applications, Ser. No. 09/290,842 of Gardner for OPTICAL ASSEMBLY HAVING LENS OFFSET FROM OPTICAL AXIS, filed on Apr. 13,1999; and Ser. No. 09/292,781 of Gardner for LOW POWER ILLUMINATOR, filed on Apr. 13, 1999, which are both hereby incorporated by reference for all that is disclosed therein.

The imaging apparatus 400 may be located in the interior of the housing 305 and in the vicinity of the corner 338 of the media handler 300. The imaging apparatus 400 may be electrically connected to the processor 500 by an image data line 510. The imaging apparatus 400 may, as an example, be a bar code reader. Bar code readers are well known in the art and are commonly used to image areas of high and low reflectivity to "read" bar codes. The imaging apparatus 400 may have a depth of field suited to allow the imaging apparatus to image bar codes located outside the media handler 300. The depth of field may also be suited so that the imaging apparatus 400 may image the area of reflective contrast 270 of FIG. 2. The imaging apparatus will be described in detail below.

The media handler 300 may be operatively connected to a servo system 350 and an orientation system 370. The servo system 350 may serve to move the media handler 300 to a specified location and in a conventional manner. The orientation system 370 may determine the location of the media handler 300 with reference to a predetermined location in the automated media exchanger 100. The orientation system 370 may also operate in a conventional manner. The servo system 350 may be connected to the processor 500 by a servo data line 520. The orientation system 370 may be connected to the processor 500 by an orientation data line 530. Examples of servo and orientation systems are described in U.S. Pat. No., 5,544,146 for CARTRIDGE HANDLING SYSTEM of Luffel et al., which is hereby incorporated by reference for all that is disclosed therein.

Figure 4:
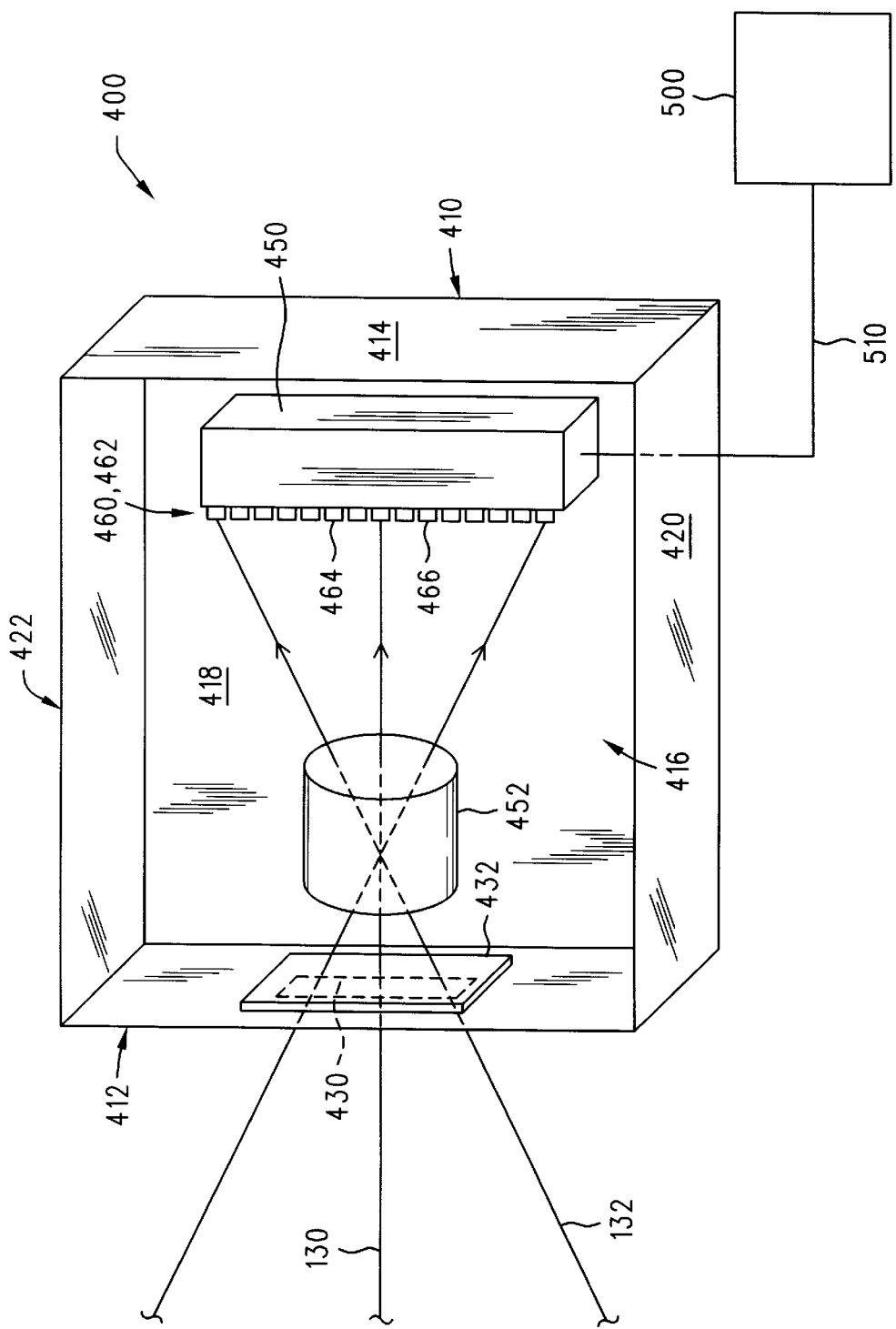
FIG. 4 is a side perspective view of the imaging apparatus of FIG. 3 including the light paths associated with the imaging apparatus.

An embodiment of the imaging apparatus 400 is illustrated in detail in FIG. 4. The imaging apparatus 400 may have a housing 410. The housing 410 may have a front side 412, a back side 414, a left side 416, a right side 418, a bottom side 420, and a top side 422. The imaging apparatus 400 of FIG. 4 is illustrated with the left side 416 open to better view the components located within the housing 410. The front side 412 may have an opening 430. The opening 430 may have a window 432 covering the opening 430. The window 432 may serve to keep contaminates from entering the housing 410. The window 432 may be a pane of material that is transparent to light. Alternatively, the window 432 may be a pane of material that is relatively transparent to a specific frequency band of light so as to perform as a band pass filter, e.g., the window 432 may pass the frequency of light emitted by the light source 120 of FIG. 3. A photosensor 450 may be affixed to the right side 418 of the housing 410. An image light path 130 may be present in the imaging apparatus 400 extending from a point external to the imaging apparatus 400 through the opening 430, through the window 432 and terminating at the photosensor 450. An image light beam 132 may follow the image light path 130 from a point external to the imaging apparatus 400 to the photosensor 450. A lens 452 may be located in the image light path 130 between the window 432 and the photosensor 450. The lens 452 may serve to focus the image light beam 132 onto the photosensor 450.

The photosensor 450 is a device that converts the image light beam 132 to image data. For the purpose of illustration only, the imaging apparatus 400 will be described herein using a charged coupled device as the photosensor 450. However, it is to be understood that the photosensor 450 may, alternatively, be any other photosensor device that is capable of converting light to image data. The photosensor 450 may comprise at least one linear array 460 of individual photodetectors 462 extending approximately the length of the photosensor 450. The photosensor 450 may be approximately three centimeters in length and may comprise approximately 2,700 linearly aligned photodetectors 462 in the photodetector array 460. The individual photodetectors 462 may be approximately 11 microns wide. The photodetector array 460 may face the opening 430 in the housing 410 and the photodetector array 460 may be located at the termination of the image light path 130. One example of a commercially available photosensor is available from the NEC Corporation and is sold as model number 3734ACY.

The photosensor 450 may convert a narrow "scan line" portion of the image light beam 132 to image data. Specifically, the individual photodetectors 462 may output voltages that correspond to the intensity of light the photodetectors 462 receive. The scan line portion of the image light beam 132 may be approximately as narrow as the photodetectors 462, e.g., 11 microns. The processor 500 may be electrically connected to the photosensor 450 by the image data line 510 and the processor 500 may serve to analyze the image data generated by the photodetectors 460.

Referring again to FIG. 1, the processor 500 may be electrically connected to the imaging apparatus 400 by the image data line 510. The processor 500 may be electrically connected to the servo system 350 by the servo data line 520 and the processor 500 may be electrically connected to the orientation system 370 by the orientation data line 530. The processor 500 may comprise a microprocessor 502 and a data storage device 504. The microprocessor 502 may be adapted to output data signals to the servo system 350, receive data signals from the orientation system 370, and process image data from the imaging apparatus 400. The data storage device 504 may be adapted to store image data from the imaging apparatus 400, predetermined characters corresponding to the identity of specific media, and location information corresponding to the location of specific digital linear tape cartridges 600 in the magazine 200.

Figure 5:
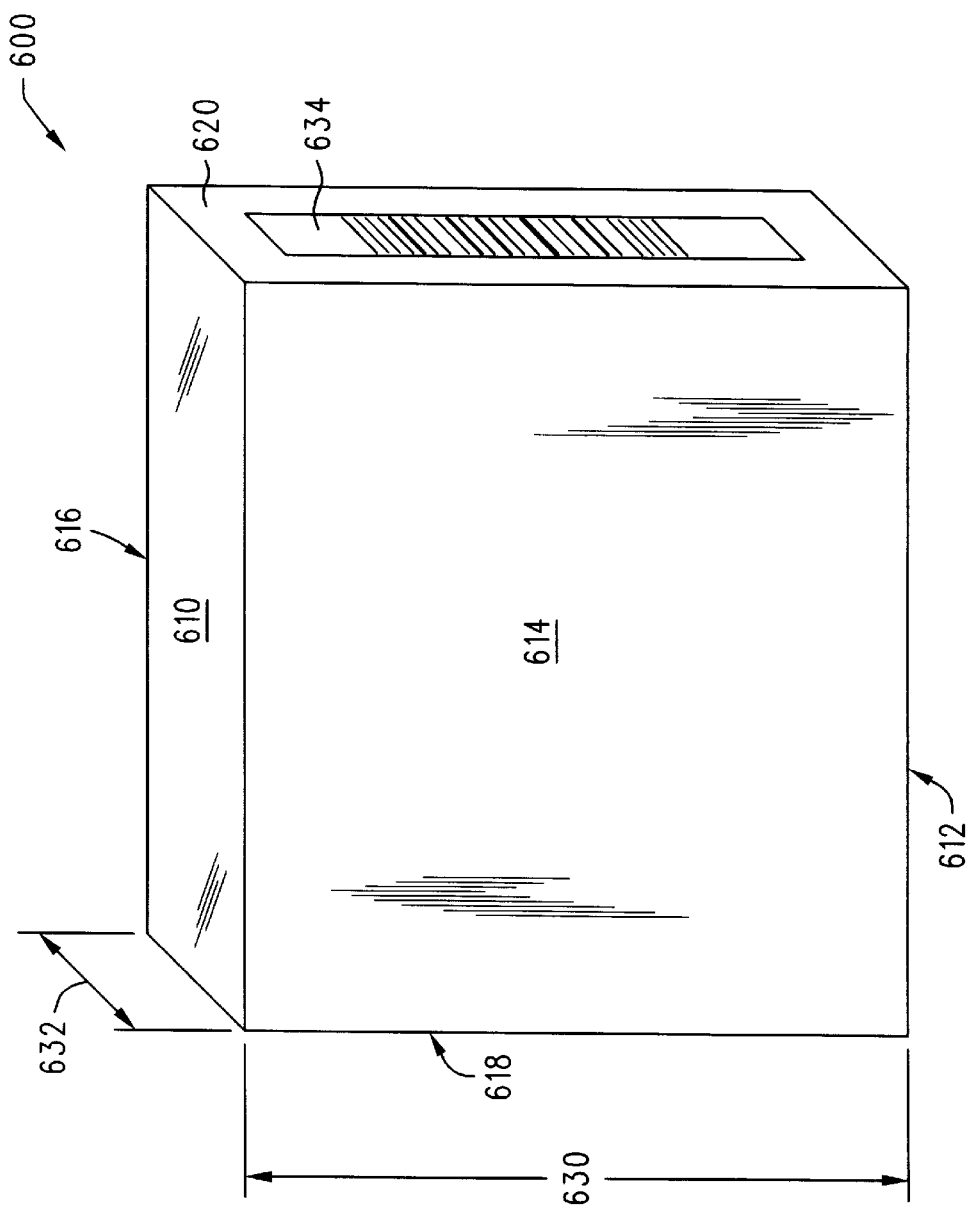
FIG. 5 is a side perspective view of a digital linear tape cartridge.

A digital linear tape cartridge 600 is illustrated in detail in FIG. 5. It is to be understood that a digital linear tape cartridge is described herein for illustration purposes only. The automated media exchanger 100 may, alternatively, be adapted to use other forms of media. The digital linear tape cartridge 600 may have a top side 610, a bottom side 612, a left side 614, a right side 616, a back side 618, and a front side 620. The digital linear tape cartridge 600 may have a height 630 extending between the top side 610 and the bottom side 612. The digital linear tape cartridge 600 may have a width 632 extending between the left side 614 and the right side 616. The width 632 and height 630 of the digital linear tape cartridge 600 may be smaller than the width 334 and the height 336 of the opening 320 of the media handler 300, FIG. 3, so that the digital linear tape cartridge 600 may pass through the opening 320 and into the housing 305 of the media handler 300.

A bar code 634, or other optical indicia, may be affixed to the front side 620 of the digital linear tape cartridge 600. The bar code 634 may comprise a series of alternating, parallel reflective and nonreflective stripes. The reflective stripes are referred to as "spaces" and the nonreflective stripes are referred to as "bars." The spaces may be light-colored so as to be relatively reflective and the bars may be dark-colored so as to be relatively nonreflective. The bars and spaces may be either wide or narrow. The bar code 634 may represent a binary number where the transition from a bar to a space represents the transition from one binary bit to another bit. The widths of the bars and spaces may determine the values of the bars and spaces, e.g., a wide bar or space may represent a one and a narrow bar or space may represent a zero. The cumulation of the bars and spaces on the bar code 634 may represent the binary number. The binary number representing by the bar code 634 may serve to identify a specific digital linear tape cartridge 600 to which the bar code is attached. An example of a bar code specification that may be applied to the bar code label 634 is known in the art as the code 39 specification.

Having described the physical layout of the automated media exchanger 100, the operation of the automated media exchanger 100, FIG. 1, will now be described. Specifically, the operation of the automated media exchanger 100 used to determine if a slot 232 in a magazine 200 contains media will be described below.

The following sequence summarizes the operation of the automated media exchanger 100, FIG. 1. The operation of the automated media exchanger is also described by the flow chart of FIG. 6. The operation of the automated media exchanger 100 requires that the media handler 300 be mobile relative to the magazine 200. The servo system 350 may move the media handler 300 in a transverse direction 140 along a line parallel to the plane of the front side 230 of the magazine 200. Additionally, the servo system 350 may move the media handler 300 in a plunge direction 142 normal to the plane of the front side 230 of the magazine 200. The servo system 350 may move the media handler 300 far enough in the plunge direction 142 so the media handler 300 may retrieve a digital linear tape cartridge 600 from a slot 232 in the magazine 200.

The servo system 350 may also move the media handler 300 to a position where the opening 320 in the front side 310 of the media handler 300 is opposite one of the slots in the front side 230 of the magazine 200. When the opening 320 is opposite one of the slots, the incident light beam 122 emitted by the light source 120 will illuminate the slot 232. If the slot 232 is empty, the incident light beam 122 will extend to the inner surface 258 of the magazine 200. If, on the other hand, the slot 232 is occupied by a digital linear tape cartridge 600, the incident light beam 122 will be blocked by the cartridge 600 and, thus, only extend to the front surface 620 of the digital linear tape cartridge 600. The image light beam 132 is a reflection from the surface that the incident light beam 122 illuminates. Therefore, if the slot 232 is empty, the image light beam 132 will extend between the inner surface 258 and the imaging apparatus 400. The image light beam 132 will, thus, be an image of the inner surface 258 including the area of reflective contrast 270. If, however, the slot 232 is occupied, the image light beam 132 will extend between a digital linear tape cartridge 600 and the imaging apparatus 400. In this case, the image beam 132 will be an image of the front side 620, FIG. 5, of a digital linear tape cartridge 600. If the cartridge 600 is oriented properly within the slot, then the image beam 132 will be an image of a bar code 634 affixed to the front side 620 of a digital linear tape cartridge 600.

The imaging apparatus 400 converts the intensities of light in the image light beam 132 to image data that may be analyzed by the processor 500. The processor 500 may be adapted to distinguish between data representing an image of the area of reflective contrast 270 and data representing an image of the bar code 634. If the image beam 132 is an image of the inner surface 258, the imaging apparatus 400 will output data to the processor 500 indicative of the image of the inner surface 258, including the area of reflective contrast 270. The processor 500 may then indicate, with certainty, that the slot 232 is empty. If, on the other hand, the image beam 132 is not an image of the inner surface 258, the processor 500 may indicate that the slot 232 is occupied. Additionally, if the image beam 132 is an image of a bar code 634, FIG. 5, the processor 500 may indicate, with certainty, that the slot 232 is occupied by a digital linear tape cartridge 600. The processor 500 may also read the bar code 634 and identify the digital linear tape cartridge 600.

As previously set forth, the imaging apparatus 400 may be located in a corner 338 of the media handler 300. The corner 338 is defined by the intersection the back side 312, the top side 314, and the left side 318 of the media handler housing 305. The reason for locating the imaging apparatus 400 in the corner 338 is to allow the imaging apparatus 400 to be located inside the housing 305 of the media handler 300 so as not to interfere with a digital linear tape cartridge 600 that may also be located in the housing 305. If the imaging apparatus 400 were to be located in another area of the housing 305, the imaging apparatus 400 may interfere with a digital linear tape cartridge 600 that may also be located in the housing 305. In the alternative, the physical size of the housing 305 may have to be increased to accommodate the imaging apparatus 400 and a digital linear tape cartridge 600, or the imaging apparatus 400 may be located external to the housing 305.

Several components, discussed below, may be located in the interior of the media handler 300. These components may serve to extract digital linear tape cartridges from slots in the magazines and, thus, the components may have to be located at precise locations within the media handler 300. The addition of the imaging apparatus 400 into the interior of the media handler 300 may create congestion within the media handler 300. In order to accommodate the imaging apparatus 300 and the other components that may be located in the media handler 300, the imaging apparatus 400 may not be able to be located in a position to receive the image beam 132. The image beam 132 may, thus, have to be optically shifted within the media handler 300 so that the imaging apparatus 400 may receive the image beam 132. An example of optically shifting an image light beam within a media handler is disclosed in U.S. patent application, Ser. No. 09/290,842 of Gardner et al., previously referenced.

The media handler 300 and the magazine 200 are best located relative to each other so as to avoid specular reflection between the incident light beam 122 and the image light beam 132. Specular reflection is similar to glare and may cause areas of the surface where reflection occurs that are intended to have low reflectivity to be highly reflective. Specular reflection may result when the angles of an incident light beam and an image light beam are approximately equal relative to the normal of a reflecting surface. Specular reflection may also occur if the image light beam is approximately normal to the reflecting surface. In the case of the automated media exchanger 100, specular reflection may cause the image light beam 132 to be a high intensity of light regardless of the reflectivity of the surface from which the image light beam 132 emanates. If the image light beam 132 is an image of the inner surface 258 of the magazine 200, specular reflection may cause the image to be uniform throughout the area of reflective contrast 270. In this case, the processor 500 may not be able to distinguish the area of reflective contrast 270 from the inner surface 258. As such, the processor 500 will not be able to accurately indicate whether the slot 232 contains a digital linear tape cartridge 600. The same problem with specular reflection may occur if the image light beam 132 is an image of a bar code 634. The bars and the spaces on the bar code 634 may reflect equally. The processor 500 will, thus, be unable to distinguish the bars from the spaces and will, likewise, be unable to read the bar code 634.

The preferred reflection of an image light beam is diffuse reflection. Diffuse reflection may be characterized by a scattering of reflected light from a nonreflective surface. An imaging apparatus will, therefore, receive a minimal intensity of light from a nonreflective surface. Diffuse reflection may be achieved in the automatic media exchanger 100 by placing the angles of the incident light path 124 and the image light path 130 such that they are not approximately equal relative to the normal of the inner surface 258 of the magazine 200 or the front surface 620 of a digital linear tape cartridge 600, FIG. 5. Additionally, diffuse reflection may be realized by locating the image light path 130 a significant distance from the normal of the inner surface 258 and the front surface 620 of a digital linear tape cartridge 600, FIG. 5.

Having summarized the operation of the automatic media exchanger 100, FIG. 1, the operation of the automatic media exchanger 100 will now be described in detail. In the operation of the automatic media exchanger 100, a user of the automated media exchanger 100 places digital linear tape cartridges 600, sometimes referred to herein simply as, "cartridges" into the slots 232 in the magazine 200. In the magazine 200 depicted in FIG. 1, for example, the slot 234 in the magazine 200 is empty. The slot 236 is occupied by a cartridge 672 and the cartridge 672 has a bar code label 682 affixed to the front side 673 of the cartridge 672. The slot 238 is occupied by a cartridge 674 and the cartridge 674 does not have a bar code label affixed to the front side 675 of the cartridge 674. The slot 240 is occupied by a cartridge 676 and the cartridge 676 has a bar code label 686 affixed to the front surface 677 of the cartridge 676. For the purpose of illustration, the bar code label 686 will be assumed to be affixed to the front surface 677 of the cartridge 676 upside down. The slot 242 is depicted as being occupied by a cartridge 678 and the cartridge 678 has a bar code label 688 affixed to the front surface 679 of the cartridge 678.

The processor 500 may initiate a series of instructions that will cause the automated media exchanger 100 to determine whether the slot 234 is occupied. The processor 500 may first receive data from the orientation system 370 via the orientation data line 530 indicating the location of the media handler 300. The processor 500 may then send a data signal to the servo system 350 via the servo data line 520 instructing the servo system 350 to move the media handler 300 to the vicinity of the slot 234. Specifically, the media handler 300 will be located so that the opening 320 in the media handler 300 is opposite the slot 234. A system to guide the media handler 300 to a specific location, e.g., the vicinity of a slot 232, is disclosed in U.S. patent application Ser. No. 09/291,242 of Gardner et al. for GUIDANCE SYSTEM AND METHOD FOR AN AUTOMATED MEDIA EXCHANGER, filed on Apr. 13, 1999, which is hereby incorporated by reference for all that is disclosed therein.

At this location, the incident light beam 122 emitted by the light source 120 will illuminate the slot 234. The slot 234 does not contain a digital linear tape cartridge 600, therefore, the incident light beam 122 will pass through the slot 234 and to the inner surface 258 of the magazine 200. The incident light beam 122 will, thus, illuminate the inner surface 258 including the area of reflective contrast 270. The image light beam 132 will be reflected from the inner surface 258 and will, thus, be an image of the inner surface 258, including the area of reflective contrast 270. The image light beam 132 will, therefore, be more intense in the area corresponding to the area of reflective contrast 270 than the area corresponding to the remaining portion of the inner surface 258. The image light beam 132 will pass from the inner surface 258 of the magazine 200, through the slot 234 and to the media handler 300. The image light beam 132 will then pass through the opening 320 in the front side 310 of the media handler 300 and to the imaging apparatus 400.

Referring to FIG. 4, the image light beam 132 enters the imaging apparatus housing 410 through the opening 430 in the front side 412. The image light beam 132 then passes through the window 432. In the case where the window 432 is an optical filter, then only a specified band of light frequencies will pass through the window 432. The image light beam 132 is then focused by the lens 452 onto the photodetector array 460 on the photosensor 450. The photosensor 450 outputs image data in the form of voltages that correspond to the intensity light in the image light beam 132 received by the photodetector array 460. The photodetector array 460 is typically narrow, therefore, the photodetectors 462 may only image a narrow scan line portion 134, FIG. 1, of the inner surface 258 that includes the area of reflective contrast 270.

The photosensor 450 outputs image data indicating that the light in the image light beam 132 has a band of high light intensity, which corresponds to the area of reflective contrast 270. Specifically, the photodetectors 462 in the photodetector array 460, from a first high intensity photodetector 464 to a last high intensity photodetector 466, may receive the image of the area of reflective contrast 270, FIG. 1. The area of the image light beam 132 corresponding to the area of reflective contrast 270, FIG. 1, has a higher intensity of light than the remaining area of the image beam 132. Therefore, the photodetectors 462 from the first high intensity photodetector 464 to the last high intensity photodetector 466 will output higher voltages than the remaining photodetectors 462 in the photodetector array 460. The imaging apparatus 100 outputs the image data to the processor 500 via the image data line 510. The image data may be a series of voltages that correspond to the cumulative voltage outputs from the photodetectors 462 on the photosensor 450.

The image data output from the photosensor 450 is input, via the image data line 510, to the processor 500. The processor 500 may compare the voltage values of the photodetectors 462 in the photodetector array 460 to each other in order to establish the relative intensity of the light received by the photodetectors 462. Alternatively, the processor 500 may compare the values of the voltages from the photodetectors 462 to a reference value stored in the data storage device 504. The reference value corresponds to a predetermined light intensity. Photodetector values higher than the reference value correspond to a high light intensity and photodetector values lower than the reference value correspond to a low light intensity. The processor 500 may then count the number of consecutive photodetectors 462 that output a voltage indicating they received a high intensity of light. The processor 500 may compare this number to a predetermined number corresponding to the number of consecutive photodetectors 462 outputting a high voltage that may indicate that the area of reflective contrast 270 is being imaged. If the number of photodetectors 462 indicating they received a high intensity of light is approximately equal to the predetermined number stored by the processor 500, the processor 500 may then determine that the imaging apparatus 400 is imaging the area of reflective contrast 270. When the imaging apparatus 400 images the area of reflective contrast 270, the processor 500 is able to determine, with certainty, that the slot 234, FIG. 1, is empty. Accordingly, the automated media exchanger 100 is able to indicate, with certainty, that the slot 234 is empty.

The method described above of counting photodetectors is one example of measuring the width 276 of the area of reflective contrast 270, FIG. 1. Other methods of using an image beam to measure object dimensions are disclosed in the following U.S. patent applications: Ser. No. 09/290,807 of Gardner for CALIBRATION SYSTEM FOR AN IMAGING APPARATUS AND METHOD, filed on Apr. 13,1999; Ser. No. 09/290,429 of Gardner et al. for IMAGING APPARATUS; which are both hereby incorporated by reference for all that is disclosed therein.

Referring again to FIG. 1, the processor 500 may initiate a series of instructions that will cause the automated media exchanger 100 to determine whether the slot 236 is occupied. The processor 500 may first receive information from the orientation system 370 via the orientation data line 530 indicating the location of the media handler 300. The processor 500 may then send a data signal to the servo system 350, via the servo data line 520, instructing the media handler 300 to move to the vicinity of the slot 236 in the magazine 200. Specifically, the media handler 300 will move to a position where the opening 320 in the front of the media handler 300 is opposite the slot 236. The incident light beam 122 emitted by the light source 120 will then illuminate the slot 236. The slot 236 is depicted as containing a digital linear tape cartridge 672. The cartridge 672 is depicted as having a bar code label 682 affixed to the front side 673 of the cartridge 672. The incident light beam 122 and the image light beam 132 will, thus, intersect at the front side 673 of the cartridge 672. Accordingly, the image light beam 132 will be an image of the bar code label 682 affixed to the front side 673 of the cartridge 672. As previously set forth, the image light beam 132 is ultimately focused on the photosensor 450. The photosensor 450 will, thus, convert the image of the bar code label 682 to image data.

The imaging apparatus 400, thus, will not output image data to the processor 500 indicating that a predetermined number of consecutive photodetectors 462 have imaged an area corresponding to the area of reflective contrast 270. Based on this image data, the processor 500 may determine that the slot 236 in the magazine 200 is occupied by a digital linear tape cartridge 672. The processor 500 may then "read" the bar code label 682 to determine whether it is actually a bar code label. For example, the processor may determine whether the image data corresponds to a predetermined bar code format, e.g., the code 39 specification. If the bar code label 682 is, in fact, a predetermined bar code format, the processor will analyze the image data to read the binary number represented by the bar code label 682. Reading a bar code is well known in the art and consists of measuring the bars and spaces to determine if the bars and spaces are wide or narrow. The wide bars and spaces, as an example, may be assigned a number one and the narrow bars and spaces may be assigned a zero. The ones and zeros represented by the series of bars and spaces represents a binary number.

Based on the analyzed image data, the processor 500 may indicate that the slot 236 is occupied by the cartridge 672. Additionally, the binary number from the bar code label 682 corresponding to the cartridge 672 may be stored in the data storage device 504. When the automated media exchanger 100 needs to access the cartridge 672, the processor 500 may scan the data storage device 504 and determine that the cartridge 672 is located in the slot 236. The processor 500 may then send a signal to the servo system 350 instructing the servo system 350 to move the media handler 300 to a location where the media handler 300 may access the cartridge 672.

The processor 500 may initiate a series of instructions that will cause the automated media exchanger 100 to determine whether the slot 238 is occupied. The processor 500 may first receive information from the orientation system 370 via the orientation data line 530 indicating the location of the media handler 300. The processor 500 may then send a data signal to the servo system 350, via the servo data line 520, instructing the media handler 300 to move to the vicinity of the slot 238. Specifically, the media handler 300 will move to a position where the opening 320 in the front of the media handler 300 is opposite the slot 238. The light source 120 will then illuminate the slot 238.

As previously set forth, the slot 238 contains a digital linear tape cartridge 674. The cartridge 674 does not have a bar code label affixed to the front side 675 of the cartridge 674. The incident light beam 122 will, therefore, illuminate the front side 675 of the cartridge 674. As such, the image light beam 132 will be an image of the blank front side 675 of the cartridge 674 and will neither be the image of the area of reflective contrast 270 nor a bar code. The imaging apparatus 400 will, thus, output image data to the processor 500 that corresponds to the blank front side 675 of the cartridge 674. Therefore, the processor 500 will determine that the slot 238 is occupied by a cartridge 674 and that the cartridge 674 is either missing a bar code label or the cartridge 674 is positioned incorrectly in the slot 238. The automated media exchanger 100 may then indicate that a possible problem exists with the cartridge 674 located in the slot 238.

The processor 500 may initiate a series of instructions that will cause the automated media exchanger 100 to determine whether the slot 240 is occupied. The processor 500 may first receive information from the orientation system 370 via the orientation data line 530 indicating the location of the media handler 300. The processor 500 may then send a data signal to the servo system 350, via the servo data line 520, instructing the media handler 300 to move to the vicinity of the slot 240. Specifically, the media handler 300 will move to a position where the opening 320 in the front of the media handler 300 is opposite the slot 240. The incident light beam 122 from the light source 120 will then illuminate the slot 240. The slot 240 contains a digital linear tape cartridge 676. The cartridge 676 has a bar code label 686 affixed to the front side 677. As previously set forth, the bar code label 686 is upside down, which may indicate that either the bar code label 686 is affixed to the front surface 677 of the cartridge 676 upside down or the cartridge 676 is positioned in the slot 240 upside down.

The image light beam 132 will reflect from the front surface 677 of the cartridge 676 and will, thus, be an image of the bar code label 686 affixed to the front surface 677 of the cartridge 676. The imaging apparatus 400 will, therefore, image the bar code label 686. As previously set forth in the identification of the cartridge 672 in the slot 236, the processor 500 may first determine whether the image data from the imaging apparatus 400 corresponds to a bar code label with a predetermined format, e.g., a code 39 specification. The processor 500 may detect a problem reading the bar code label 686 because it is upside down. In order to be sure that the bar code label 686 is upside down, the processor 500 may reverse the order that it reads the image data from the imaging apparatus 400. This will reverse the order that the bars and spaces in the bar code label 686 are read, e.g., the processor 500 may read the bar code label 686 from top to bottom rather than from bottom to top. If the reverse reading of the bar code label 686 corresponds to a predetermined bar code label format, the processor 500 may determine that either the cartridge 676 is positioned upside down in the slot 240 or the bar code label 686 affixed to the front side 677 of the cartridge 676 is upside down. The automated media exchanger 100 may, thus, notify the user that a possible problem exists with the cartridge 676 in the slot 240.

Except for the addition of the automated optical detection system described herein, the automated media exchanger 100, including the components thereof, may, for example, be of the type commercially available from the Hewlett-Packard Company and sold as Model Number HP 4228w or of the type described in the following U.S. Pat. No. 5,644,559 of Christie, et al., for FLIP LATCH ASSEMBLY FOR MEDIA AUTOCHANGER; and 5,682,096 of Christie, et al., for METHOD AND APPARATUS FOR MONITORING OPERATING POSITIONS OF A MEDIA AUTOCHANGER, which are hereby incorporated by reference for all that is therein.

The improved automated media exchanger 100 provides many benefits over other automated media exchangers. The improved automated media exchanger 100 may reduce user time in inputting data to the processor 500. The improved automated media exchanger 100 may further improve the accuracy of locating media in the media library. A user does not have to input the identity and location of the media to the processor 500, which saves the user time. The user only needs to load the media into a plurality of magazines 200 and place the magazines 200 into the automated media exchanger 100. The automated media exchanger 100 may then scan the slots 232 in the magazines 200 to locate and identify the media. The automated media exchanger 100 may also indicate problems to the user, e.g., missing bar code labels and upside down media. The efficiency of the automated media exchanger 100 is also increased because the automated media exchanger 100 will not attempt to retrieve media from empty slots 232 in the magazine 200. The automated media exchanger 100 may determine, with certainty, that a slot 232 is empty before the automated media exchanger 100 attempts to retrieve media from the slot 232.

The operation of the automated media exchanger 100 described herein has been limited to the operation of the imaging apparatus 400, including the interaction between the imaging apparatus 400 and the magazine 200. The automated media exchange 100, including the components located within the automated media exchanger 100 function in a substantially similar manner as an autochanger, known as Model Number HP 4228w, commercially available from the Hewlett-Packard Company of Greeley, Colorado. The automated media exchanger 100, including the media handler 300 operates in a substantially similar manner as described in the following U.S. patent applications: 5,644,559 of Christie, et al., for FLIP LATCH ASSEMBLY FOR MEDIA AUTOCHANGER; and 5,682,096 of Christie, et al., for METHOD AND APPARATUS FOR MONITORING OPERATING POSITIONS OF A MEDIA AUTOCHANGER, which are hereby incorporated by reference for all that is therein.

The automated media exchanger 100 and the components thereof are also disclosed, in part, in the following U.S. patent applications: Ser. No. 09/290,216 of Gardner for ALIGNMENT APPARATUS AND METHOD FOR AN IMAGING SYSTEM, filed on Apr. 13, 1999; Pat. No. 6,118,598 of Gardner for METHOD AND APPARATUS FOR SETTING FOCUS IN AN IMAGING DEVICE; and Ser. No. 09/290,428 of Kato et al. for METHOD OF DECIPHERING BAR CODES, filed on Apr. 13, 1999; which are all hereby incorporated by reference for all that is disclosed therein.

Figure 6:
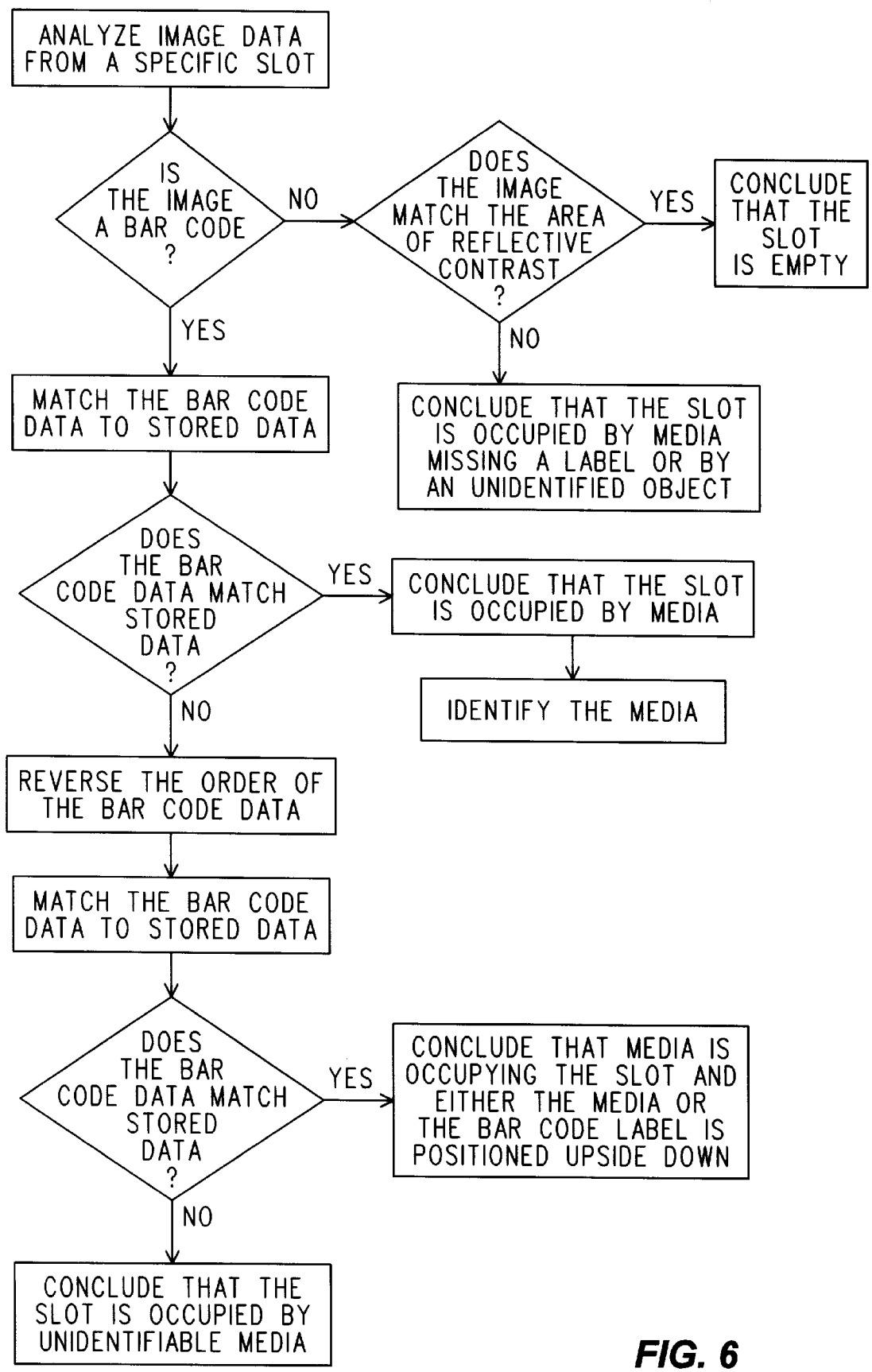
FIG. 6 is a flow chart diagram depicting a method of detecting an object using an imaging apparatus.

The method of locating cartridges 600, FIG. 5, in the automated media exchanger 100 is illustrated by the flow chart of FIG. 6. The flow chart of FIG. 6 refers to the components of the automated media exchanger 100 of FIG. 1. The method commences when the processor 500 receives image data from the imaging apparatus 400 corresponding to an image of the slot 232 being analyzed. The image data is analyzed and a determination is made as to whether the image data corresponds to a bar code. If the image data does not correspond to a bar code, a determination is made as to whether the image data corresponds to the area of reflective contrast 270. If the image data corresponds to the area of reflective contrast 270, the automatic media exchanger 100 may indicate that the slot 232 is empty. If the image data does not correspond to the area of reflective contrast 270, the automatic media exchanger 100 may indicate that the slot 232 is occupied by a cartridge 600. The automatic media exchanger 100 may further indicate that the cartridge 600 either does not have a bar code label affixed to it or the cartridge 600 is improperly positioned in the slot 232.

Returning to the decision as to whether the image data represents a bar code, if the image data does represent a bar code, the bar code data is matched to stored data. A decision is then made to determine if the bar code data matches stored data. If the bar code data matches stored data, the automatic media exchanger 100 may indicate that the slot 232 is occupied and the automatic media exchanger 100 may identify the cartridge 600 occupying the slot 232. If the bar code data does not match stored data, the processor 500 may reverse the order of the image data representing the bar code. Reversing the order of the image data will determine if the bar code label or the cartridge 600 is upside down. The reversed image data is then compared to stored data. If the reverse order of the image data matches stored data, the automatic media exchanger 100 may indicate that either the bar code label or the cartridge 600 is upside down. If the reverse order of the data does not match stored data, the automatic media exchanger 100 may indicate that the slot 232 is occupied by unidentifiable media.

Figure 7:
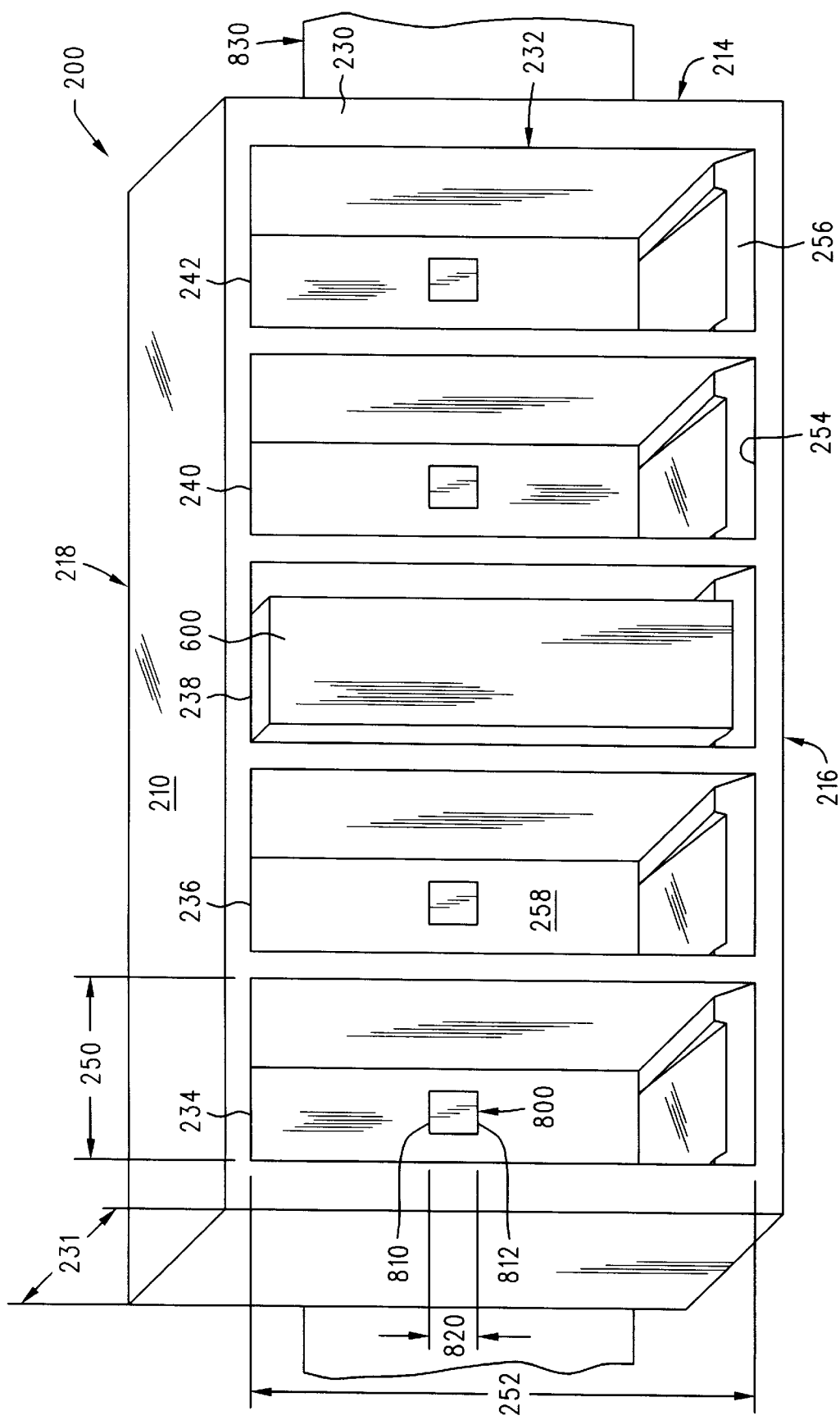
FIG. 7 is an embodiment of the magazine of FIG. 2

An embodiment of the magazine 200 is illustrated in FIG. 7. This embodiment of the magazine 200 has a plurality of openings 800 formed in the back side 218 of the magazine 200 rather than having an area of reflective contrast 270. The openings 800 may have a top edge 810 and a bottom edge 812. The openings may have a width 820 extending between the top edge 810 and the bottom edge 812. The width 820 may be substantially similar to the width 276 of the area of reflective contrast 270, FIG. 2. A reflective surface 830 may be located behind the magazine 200 in the vicinity of the back side 218. The reflective surface 830 may, as an example, be a structural member within the automated media exchanger 100 that reflects light. The automated media exchanger 100 functions in the same manner as described above by detecting the reflective surface 830 through the openings 800. This embodiment may decrease the cost of manufacturing the automated media exchanger 100 by not requiring the area of reflective contrast to be placed within the magazine 200.

Figure 8:
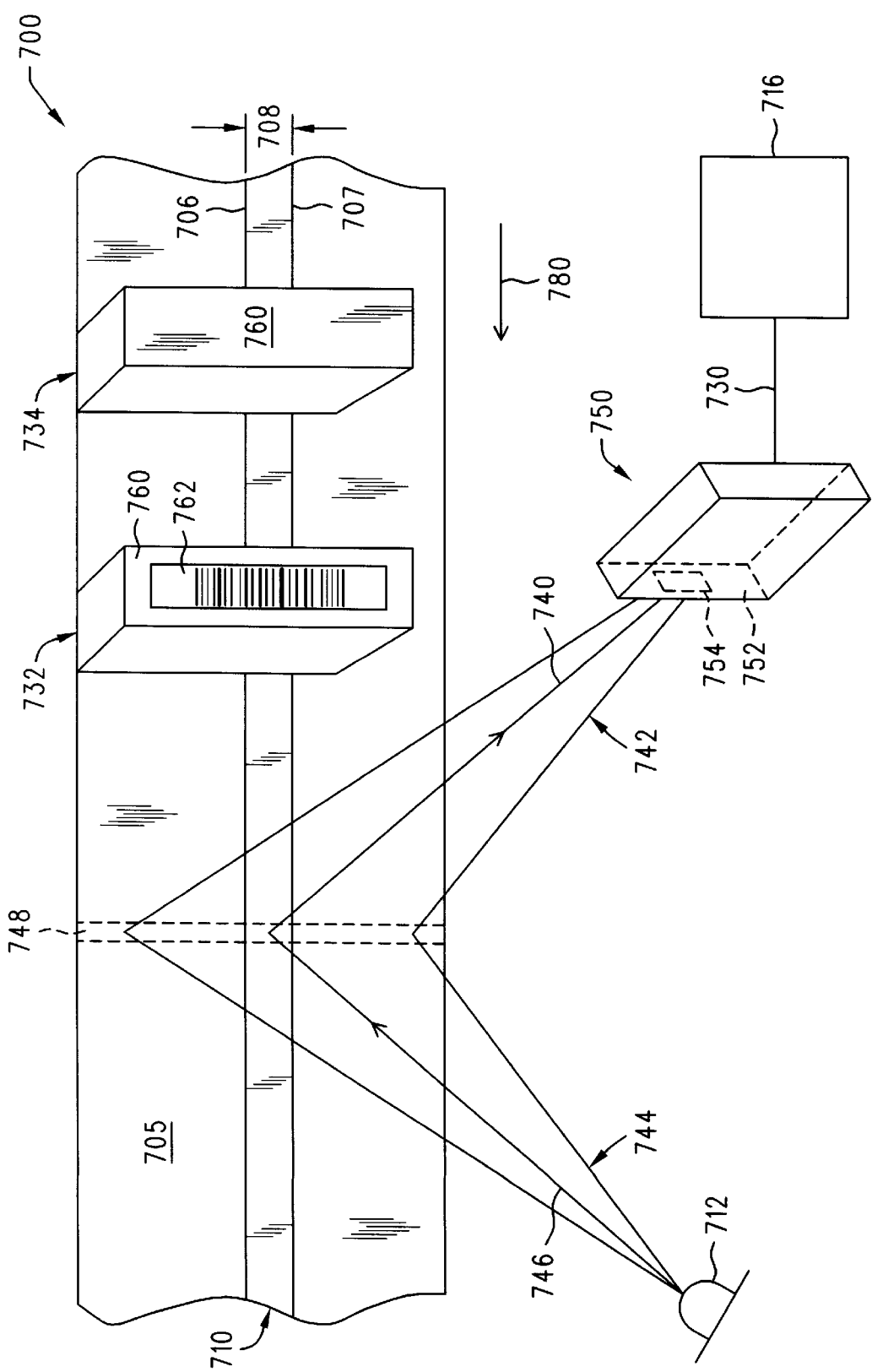
FIG. 8 is a top perspective view of an object detection system used in conjunction with a conveyor system

The automated optical detection system may be used in other devices to locate and identify objects. FIG. 8 illustrates a conveyor system 700 using an embodiment of the automated optical detection system to locate and identify objects on a conveyor belt 705. The conveyor system 700 of FIG. 8 may have a conveyor belt 705, an area of reflective contrast 710, a light source 712, an imaging apparatus 750, and a processor 716. The conveyor system 700 may further comprise an incident light path 746 extending between the light source 712 and the conveyor belt 705 and an image light path 740 extending between the conveyor belt 705 and the imaging apparatus 750. The light source 712 may emit an incident light beam 744 that follows the incident light path 746 toward the conveyor belt 705. The incident light beam 744 may serve to illuminate a scan line portion 748 of the conveyor belt 705. An image light beam 742 may be reflected from the scan line portion 748 of the conveyor belt 705. The image light beam 742 may follow the image light path 740 from the scan line portion 748 of the conveyor belt 705 to the imaging apparatus 750.

The area of reflective contrast 710 may extend the length of the conveyor belt 705. The area of reflective contrast 710 is similar to the area of reflective contrast 270 on the inner surface 258 of the magazine 200 described in FIG. 1. The area of reflective contrast 710 may be a light-colored stripe and the remaining area of the conveyor belt 705 may be a dark color. The area of reflective contrast 710 is then the transition from the dark-colored area of the conveyor belt 705 to the light-colored area of reflective contrast 710. The reflective transition from the conveyor belt 705 to the area of reflective contrast 710 may be great enough so that the processor 716 may distinguish the area of reflective contrast 710 from the remaining area of the conveyor belt 705.

The area of reflective contrast 710 may be bound by a first edge 706 and a second edge 707. The area of reflective contrast 710 may have a width 708 defined as the distance between the first edge 706 and the second edge 707. The width 708 may be great enough so that an image of the area of reflective contrast 710 may be received by the imaging apparatus 750.

The scan line portion 748 of the conveyor belt 705 may extend perpendicular to the area of reflective contrast 710 so as to extend onto the conveyor belt 705 beyond the first edge 706 and the second edge 707 of the area of reflective contrast 710. The conveyor belt 705 may move in a direction 780 parallel to the area of reflective contrast 710 and perpendicular to the scan line portion 748. The image light path 740 and the incident light path 746 may intersect on the conveyor belt 705 at the scan line portion 748 of the conveyor belt 705. The scan line portion 748 of the conveyor belt 705 may, thus, effectively scan the length of the conveyor belt 705, including the area of reflective contrast 710, as the conveyor belt 705 moves in the direction 780

A first object 732 and a second object 734 may be located on the conveyor belt 705. The first object 732 and the second object 734 may each have a front surface 760. A bar code label 762 may be affixed to the front surface 760 of the first object 732. The bar code label 762 may serve to identify the first object 732. No bar code label is depicted as being affixed to the front surface 760 of the second object 734.

The imaging apparatus 750 may be similar to the imaging apparatus 400 of FIG. 4 as previously described. The imaging apparatus 750 may comprise a front side 752. The imaging apparatus front side 752 may have an opening 754. The opening 754 may serve as an entrance for the image light beam 742 reflected from the scan line portion 748 of the conveyor belt 705 to enter the imaging apparatus 750. The imaging apparatus 750 may be connected to the processor 716 by an image data line 730.

The imaging apparatus 750 may only convert an image of the scan line portion 748 of the conveyor belt 705 to image data. The scan line portion 748 of the conveyor belt 705 may extend perpendicular to the conveyor belt movement direction 780 and may include the area of reflective contrast 710. The image light beam 742 may, thus, include an image of the conveyor belt 705 and the area of reflective contrast 710.

The imaging apparatus 750 may have a depth of field that is able to image the bar code label 762 as well as the area of reflective contrast 710. Because bar code labels typically comprise fine lines, the depth of field of the imaging apparatus 750 may be selected to focus the fine lines of the bar code label 762 onto the photosensor, not shown, in the imaging apparatus 750. The area of reflective contrast 710 may then be outside the depth of field of the imaging apparatus 750. In order to overcome this problem, the width 708 of the area of reflective contrast 710 may be large enough so that the imaging apparatus 750 is able to focus an image of the area of reflective contrast 710 onto the photosensor. As an example, the bar code label 762 may correspond to the code 39 bar code specification, and the width 708 of the area of reflective contrast 710 may be approximately one centimeter.

The processor 716 may function in a similar manner as the processor 500 of FIG. 1. When the imaging apparatus 750 receives an image of the area of reflective contrast 710, the processor 716 may determine, with certainty, that no object is located between the scan line portion 748 of the conveyor belt 705 and the imaging apparatus 750. If the imaging apparatus 750 does not receive an image of the area of reflective contrast 710, the processor 716 may determine, with certainty, that an object is located between the scan line portion 748 of the conveyor belt 705 and the imaging apparatus 750. Furthermore, if the imaging apparatus 750 receives an image of a bar code label 762, the processor 716 may determine that an object is located between the scan line portion 748 of the conveyor belt 705 and the imaging apparatus 750. The processor 716 may also read the bar code label 762 to identify the object 732 to which the bar code label 762 is affixed.

Having described the components of the conveyor system 700, the operation of the conveyor system 700 will now be described in detail. The conveyor belt 705 may move in the direction 780. Two objects, a first object 732 and a second object 734 are illustrated as being located on the conveyor belt 705. The first object 732 and the second object 734 will eventually move to the vicinity of the scan line portion 748 of the conveyor belt 705 as the conveyor belt moves in the direction 780.

Figure 9:
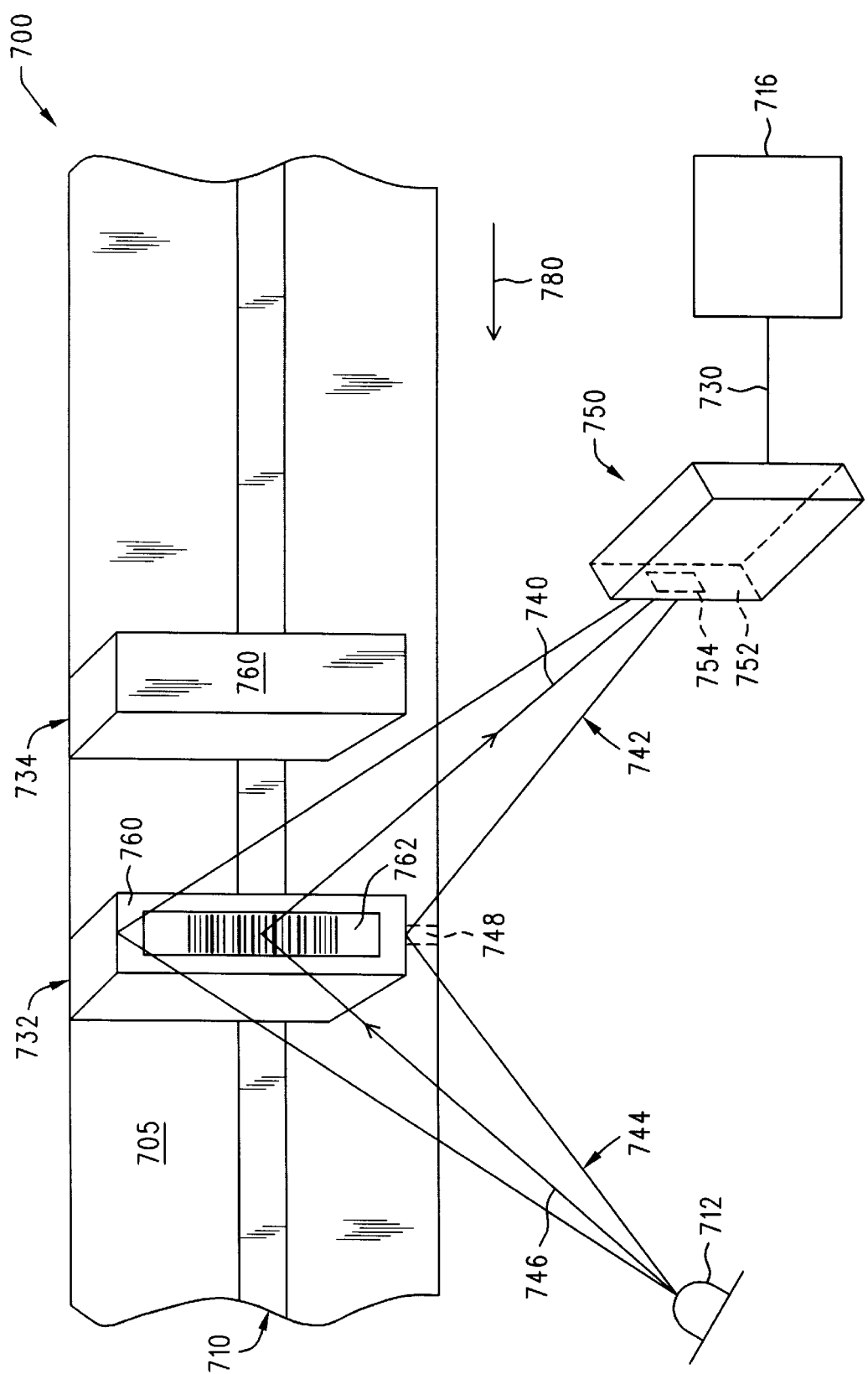
FIG. 9 is top perspective view illustrating the object detection system of FIG. 8 locating and identifying an object located on the conveyor system.

FIG. 9 depicts the conveyor system 700 with the first object 732 located in the vicinity of the scan line portion 748 of the conveyor belt 705. Specifically, the first object 732 is located between the area of reflective contrast 710 and the imaging apparatus 750. The front surface 760 of the first object 732 is now at the intersection of the incident light beam 744 and the image light beam 742. The image light beam 742 will, thus, be an image of the bar code label 762 affixed to the front surface 760 of the first object 732. The imaging apparatus 750 will, therefore, receive an image of the bar code label 762 instead of an image of the area of reflective contrast 710. The processor 716 may analyze the image data from the imaging apparatus 750 and may determine that the image data represents a bar code. Because the image data does not represent an image of the area of reflective contrast 710, the processor 716 may determine that an object is located between the area of reflective contrast 710 and the imaging apparatus 750. The processor may further read the bar code label 762 to identify the first object 732.

Figure 10:
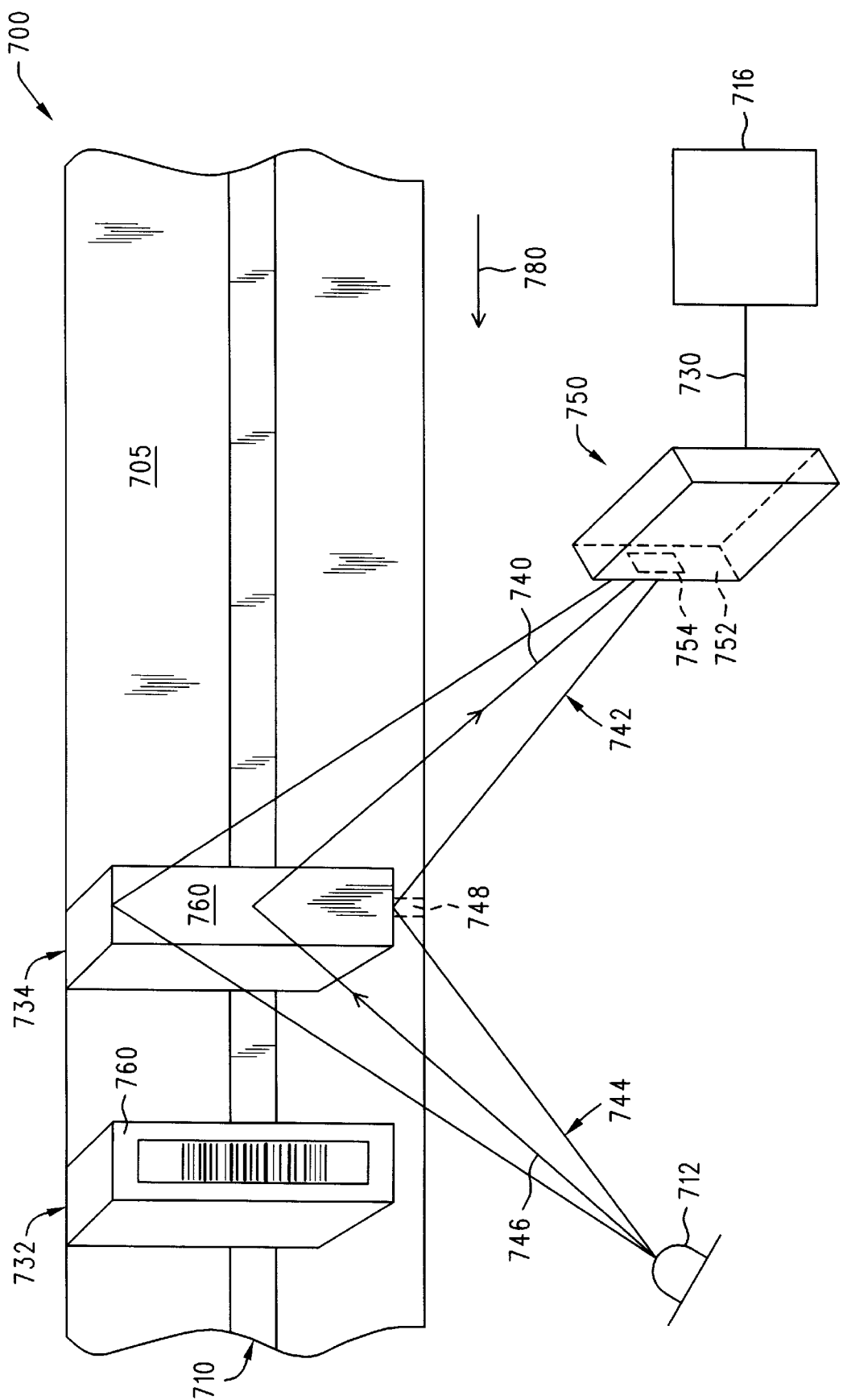
FIG. 10 is a top perspective view illustrating the object detection system of FIG. 8 locating an object on the conveyor system.

As the conveyor belt 705 continues to move in the direction 780, the second object 734 will eventually be located on the vicinity of the scan line portion 748. FIG. 10 depicts the conveyor system 700 with the second object 734 located in the vicinity of the scan line portion 748 of the conveyor belt 705. Specifically, the second object 734 is located between the area of reflective contrast 710 and the imaging apparatus 750. The incident light beam 744 and the image light beam 742 now intersect at the front surface 760 of the second object 734. The image light beam 742 will, thus, be an image of the blank front surface 760 of the second object 734. The imaging apparatus 750 will, therefore, receive neither an image of the area of reflective contrast 710 nor an image of a bar code label. The processor 716 may then determine that an object is located in the vicinity of the scan line portion 748 of the conveyor belt 705. The processor 716 may further determine that the second object 734 either does not have a bar code label affixed to the front surface 760 or the second object 734 has been placed on the conveyor belt 705 improperly so that its bar code label cannot be imaged.

Several embodiments may be applied to the automated optical detection system. One embodiment of the automated optical detection system may use objects, such as digital linear tape cartridges, with uniquely reflective front sides that may be covered by bar code labels. The uniquely reflective front side may be differentiated from the area of reflective contrast and a bar code label. When an object is being imaged that does not have a bar code label affixed to it, the uniquely reflective front side of the object may be imaged. The processor may then compare the image data to predetermined data to determine that the image data corresponds to the uniquely reflective front side of an object. The processor may then determine, with a greater probability of certainty, that an object is being imaged and that the object does not have a bar code label affixed to its front side.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A method of detecting objects comprising:
   providing a plurality of objects;
   providing an object holding mechanism having a plurality of holding locations, wherein each of said holding locations is adapted to locate at least one of said plurality of objects;
   providing an object holding mechanism target associated with said object holding mechanism;
   providing an imaging apparatus which is moveable relative to said object holding mechanism;
   positioning said imaging apparatus adjacent a selected one of said plurality of holding locations;
   generating an image with said imaging apparatus;
   performing a first analysis of said image; and
   determining whether one of said plurality of objects is located in association with said selected one of said plurality of holding locations based upon said first analysis.

2. The method of claim 1, wherein said determining comprises determining that one of said plurality of objects is not located in association with said selected one of said plurality of holding locations if said first analysis indicates that said image is an image of said holding mechanism target.

3. The method of claim 1, wherein said object is a media device.

4. The method of claim 1, wherein each of said plurality of holding locations is a slot formed within said object holding mechanism.

5. The method of claim 1 and further comprising:
providing an object target associated with at least some of said plurality of objects;
performing a second analysis of said image to determine whether said image is an image of said object target; and
determining that an error condition exists if said first analysis indicates that said image is not an image of said holding mechanism target and said second analysis indicates that said image is not an image of said object target.

6. The method of claim 5 wherein said error condition includes a condition in which one of said plurality of objects is improperly located in association with said selected one of said plurality of holding locations.

7. The method of claim 6 wherein said error condition further includes a condition in which one of said plurality of objects located in association with said selected one of said plurality of holding locations lacks an object target.

8. The method of claim 5 wherein said object target is a bar code.

9. The method of claim 3 wherein said holding mechanism is a media device magazine.

10. The method of claim 1 wherein said imaging apparatus is located within a picker mechanism adapted to move objects in and out of association with said plurality of holding locations.

11. The method of claim 1 further comprising:
providing a bar code associated with at least some of said plurality of objects;
performing a second analysis of said image to determine whether said image is an image of a bar code; and
decoding said image of said bar code so as to read said bar code if said second analysis determines that said image is an image of a bar code.

12. The method of claim 11 further comprising:
storing said decoded image of said bar code; and
storing the location of said imaging apparatus.

13. The method of claim 1 further comprising:
positioning said imaging apparatus adjacent a second selected one of said plurality of holding locations;
generating an image with said imaging apparatus;
performing a first analysis of said image to determine whether said image is an image of said holding mechanism target; and
determining whether one of said plurality of objects is located in association with said second selected one of said plurality of holding locations based upon said first analysis.

14. An automated media exchanger of the type having a media device magazine including a plurality of slots adapted to receive media devices therein and a moveable picker device positionable adjacent a selected slot of said plurality of slots and adapted to move media devices into and out of said selected slot, said automated media exchanger comprising:
a light source associated with said picker device;
an imaging apparatus associated with said picker device;
a target associated with said selected slot;
wherein said target is not imageable by said imaging apparatus when one of said media devices is received within said selected slot; and
wherein said target is imageable by said imaging device when one of said media devices is not received within said selected slot.

15. The automated media exchanger of claim 14 wherein said imaging apparatus is adapted to image bar codes.

16. The automated media exchanger of claim 14 wherein said target associated with said selected slot is a bar code.

17. The automated media exchanger of claim 14 wherein said media device comprises a first surface, and wherein said first surface is optically distinguishable from said target associated with said selected slot.

18. The automated media exchanger system of claim 17 wherein said first surface of said media device is adapted to have an indicia affixed to said first surface.

19. The automated media exchanger of claim 18 wherein said indicia is a bar code.

20. The automated media exchanger of claim 14 further comprising a movement mechanism wherein said movement mechanism is operatively connected between said media device magazine and said imaging apparatus.

21. The automated media exchanger of claim 14 further comprising an orientation device wherein said orientation device is operatively connected between said media device magazine and said imaging apparatus.

22. The automated media exchanger of claim 14 wherein said target comprises a transition from a reflective surface to a relatively nonreflective surface.

\* \* \* \* \*

UNITED STATES PATENT AND TRADEMARK OFFICE
CERTIFICATE OF CORRECTION

PATENT NO.   : 6,246,642 B1
DATED        : June 12, 2001
INVENTOR(S)  : Richard Lynn Gardner, Jr.

It is certified that error appears in the above-identified patent and that said Letters Patent is hereby corrected as shown below:

Column 3,
Line 61, after "system" insert -- . --

Column 12,
Line 15, after "RATUS" insert -- ALIGNMENT SYSTEM AND METHOD, filed on the same day as this application (attorney docket number 10971594-1) --

Column 16,
Line 51, after "780" insert -- . --

Signed and Sealed this

Third Day of December, 2002

JAMES E. ROGAN
*Director of the United States Patent and Trademark Office*